(12) United States Patent
Okamoto

(10) Patent No.: US 8,291,335 B2
(45) Date of Patent: Oct. 16, 2012

(54) ELECTRONIC BULLETIN APPARATUS

(75) Inventor: Kazuhiro Okamoto, Sakurai (JP)

(73) Assignee: Sharp Kabushiki Kaisha, Osaka (JP)

( * ) Notice: Subject to any disclaimer, the term of this patent is extended or adjusted under 35 U.S.C. 154(b) by 1065 days.

(21) Appl. No.: 12/059,549

(22) Filed: Mar. 31, 2008

(65) Prior Publication Data

US 2008/0256471 A1    Oct. 16, 2008

(30) Foreign Application Priority Data

Apr. 4, 2007 (JP) ................................ 2007-098384

(51) Int. Cl.
*G06F 3/048* (2006.01)
(52) U.S. Cl. ........................................ 715/769; 715/962
(58) Field of Classification Search .................. 715/769, 715/748, 749, 854, 864, 863, 765, 702, 711, 715/810, 962, 803; 455/414.1, 414.2, 426.1, 455/426.2
See application file for complete search history.

(56) References Cited

U.S. PATENT DOCUMENTS

| | | | |
|---|---|---|---|
| 5,877,699 A | 3/1999 | Sharpe et al. | |
| 6,252,563 B1 * | 6/2001 | Tada et al. | 345/1.1 |
| 6,972,776 B2 * | 12/2005 | Davis et al. | 345/684 |
| 7,142,205 B2 * | 11/2006 | Chithambaram et al. | 345/418 |
| 7,797,204 B2 * | 9/2010 | Balent | 705/28 |
| 7,817,991 B2 * | 10/2010 | Hinckley et al. | 455/416 |
| 2002/0002591 A1 * | 1/2002 | Ketola | 709/206 |
| 2004/0032394 A1 | 2/2004 | Ayatsuka et al. | |
| 2004/0248617 A1 | 12/2004 | Oba et al. | |
| 2006/0114175 A1 * | 6/2006 | Boukhny | 345/24 |
| 2007/0124503 A1 * | 5/2007 | Ramos et al. | 709/248 |
| 2009/0313292 A1 * | 12/2009 | Mohamad | 707/102 |

FOREIGN PATENT DOCUMENTS

| | | |
|---|---|---|
| JP | 2003-6110 A | 1/2003 |
| JP | 2003-152615 A | 5/2003 |
| JP | 2004-54879 A | 2/2004 |
| JP | 2007-26169 A | 2/2007 |
| WO | WO-02/03186 A2 | 1/2002 |
| WO | WO-03/021875 A | 3/2003 |

* cited by examiner

*Primary Examiner* — Steven Sax
(74) *Attorney, Agent, or Firm* — Birch, Stewart, Kolasch & Birch, LLP

(57) ABSTRACT

The electronic bulletin apparatus includes a connection I/F for communicatively connecting the mobile terminal, a display portion for posting the data on a screen, a touch panel for receiving from the screen an operation input for the data posted on the screen, and a control portion for transferring the data on the screen to the mobile terminal based on the operation input received by the touch panel. When the data posted on the screen is moved to a vicinity of a screen outer edge by a drag operation to be subject to a drop operation in the vicinity of the screen outer edge, the control portion transfers the data to the mobile terminal.

12 Claims, 9 Drawing Sheets

ELECTRONIC BULLETIN APPARATUS

CROSS-NOTING PARAGRAPH

This Non-provisional application claims priority under 35 U.S.C. §119(a) on Patent Application No. 2007-098384 filed in JAPAN on Apr. 4, 2007, the entire contents of which are hereby incorporated herein by reference.

FIELD OF THE INVENTION

The present invention relates to an electronic bulletin apparatus, more particularly, to an electronic bulletin apparatus, that is provided with a function of accumulating and displaying various kinds of data, and that is capable of performing a data linkage with a small-size mobile terminal such as a PIM (Personal Information Manager) and a handy terminal.

BACKGROUND OF THE INVENTION

There has been known an electronic bulletin board using a large display, etc., for electronically posting various kinds of contact information from specified persons or enterprises, further from many and unspecified persons. A user is capable of acquiring desired information by viewing and remembering contact information posted on the electronic bulletin board, or transcribing contact information into a notepad by handwriting. In such a conventional electronic bulletin board, while a display of accumulated data and an update of the accumulated data from a specific data server have been considered, a data transfer of the posted information from the electronic bulletin board to another information terminal has not been considered.

Accordingly, when an extremely large quantity of contact information is posted on the electronic bulletin board, much labor and time are required for a user himself/herself to remember in the mind, or to transcribe into a notepad by handwriting, resulting that an improvement of the convenience is required.

To cope with this, Japanese Laid-Open Patent Publication No. 2003-6110 discloses an electronic bulletin board system in which information posted on an electronic bulletin board is easily acquired. In accordance with the electronic bulletin board system, it is configured so that a mobile information terminal of an information acquiring person receives the information posted on the electronic bulletin board to display the received information on a display portion.

However, in conventional electronic bulletin board systems such as a system disclosed in Japanese Laid-Open Patent Publication No. 2003-6110, the system is generally configured under a relation between a client and a server that are connected via a network regardless of wired or wireless connection. When data is transmitted and received in such a system, most part of an operation is performed in the client side, in other words, in the side of the mobile information terminal. In most cases, an electronic bulletin board that accumulates data serves as the server and a small-size mobile information terminal serves as the client, and software for transmitting and receiving data is to be operated on the mobile information terminal.

Further, such software in the client (mobile information terminal) often treats data in a text symbol such as a file name, and therefore the data shown graphically on the electronic bulletin board can be treated only abstractively. Under such a configuration, it is difficult to say that the operability and visibility are excellent, and there has been a problem that the visibility that is a feature of the electronic bulletin board can not be effectively utilized.

Furthermore, software in the client (mobile information terminal) side is used for transmitting and receiving data between the server and the client, however, the operation can be performed only in the client side, and a method for specifying data is unclear, thus lacking intuitive operability to be recognized at a glance.

SUMMARY OF THE INVENTION

An object of the present invention is to provide an electronic bulletin apparatus, that is communicatively connected to a mobile terminal, and that performs a transfer of data to the mobile terminal by an intuitive operation such as a drag and drop operation, while posting the data with excellent visibility.

Another object of the present invention is to provide the electronic bulletin apparatus provided with connection means for communicatively connecting to the mobile terminal, comprising: bulletin means for posting data on a screen; operation input means for receiving from the screen an operation input for the data posted on the screen; and data transfer means for transferring the data on the screen to the mobile terminal based on the operation input received by the operation input means.

Another object of the present invention is to provide the electronic bulletin apparatus, wherein the operation input means is a touch panel that is arranged on the screen of the bulletin means, and when the data posted on the screen is moved to a vicinity of a screen outer edge by a drag operation to be subject to a drop operation in the vicinity of the screen outer edge, the data transfer means transfers the data to the mobile terminal.

Another object of the present invention is to provide the electronic bulletin apparatus, wherein the screen outer edge is divided into a plurality of areas, each of the divided areas including the connection means, and the data transfer means is capable of transferring data to a plurality of mobile terminals via the connection means in each of the areas.

Another object of the present invention is to provide the electronic bulletin apparatus, wherein the connection means is a reader/writer that is arranged in each of the areas for performing a non-contact wireless communication with the mobile terminal, and the data transfer means controls the data transfer for every area so that the plurality of mobile terminals are not interfered mutually via the reader/writer in each of the areas.

Another object of the present invention is to provide the electronic bulletin apparatus, wherein the non-contact wireless communication is performed with the mobile terminal via the reader/writer, and when a distance between the reader/writer and the mobile terminal reaches an effective communication distance, the electronic bulletin apparatus or the mobile terminal notifies a user that the distance has reached the effective communication distance.

Another object of the present invention is to provide the electronic bulletin apparatus, wherein the plurality of mobile terminals are connected via the reader/writers in each of the areas, and the non-contact wireless communication is performed with the plurality of mobile terminals simultaneously.

Another object of the present invention is to provide the electronic bulletin apparatus, wherein the electronic bulletin apparatus includes notification means for notifying a user of a communication state between the electronic bulletin apparatus and the mobile terminal.

Another object of the present invention is to provide the electronic bulletin apparatus, wherein the notification means for notifying a user of a communication state between the electronic bulletin apparatus and the mobile terminal is provided in each area of the outer edge.

Another object of the present invention is to provide the electronic bulletin apparatus, wherein the notification means is an indicator lamp, the indicator lamp performs the notification operation to the user at the time when the communication with the mobile terminal is established or when data transfer to the mobile terminal is completed.

Another object of the present invention is to provide the electronic bulletin apparatus, wherein the data transfer means deletes the data posted by the bulletin means at the time when the data transfer to the mobile terminal is completed.

PREFERRED EMBODIMENTS OF THE INVENTION

Figure 1:
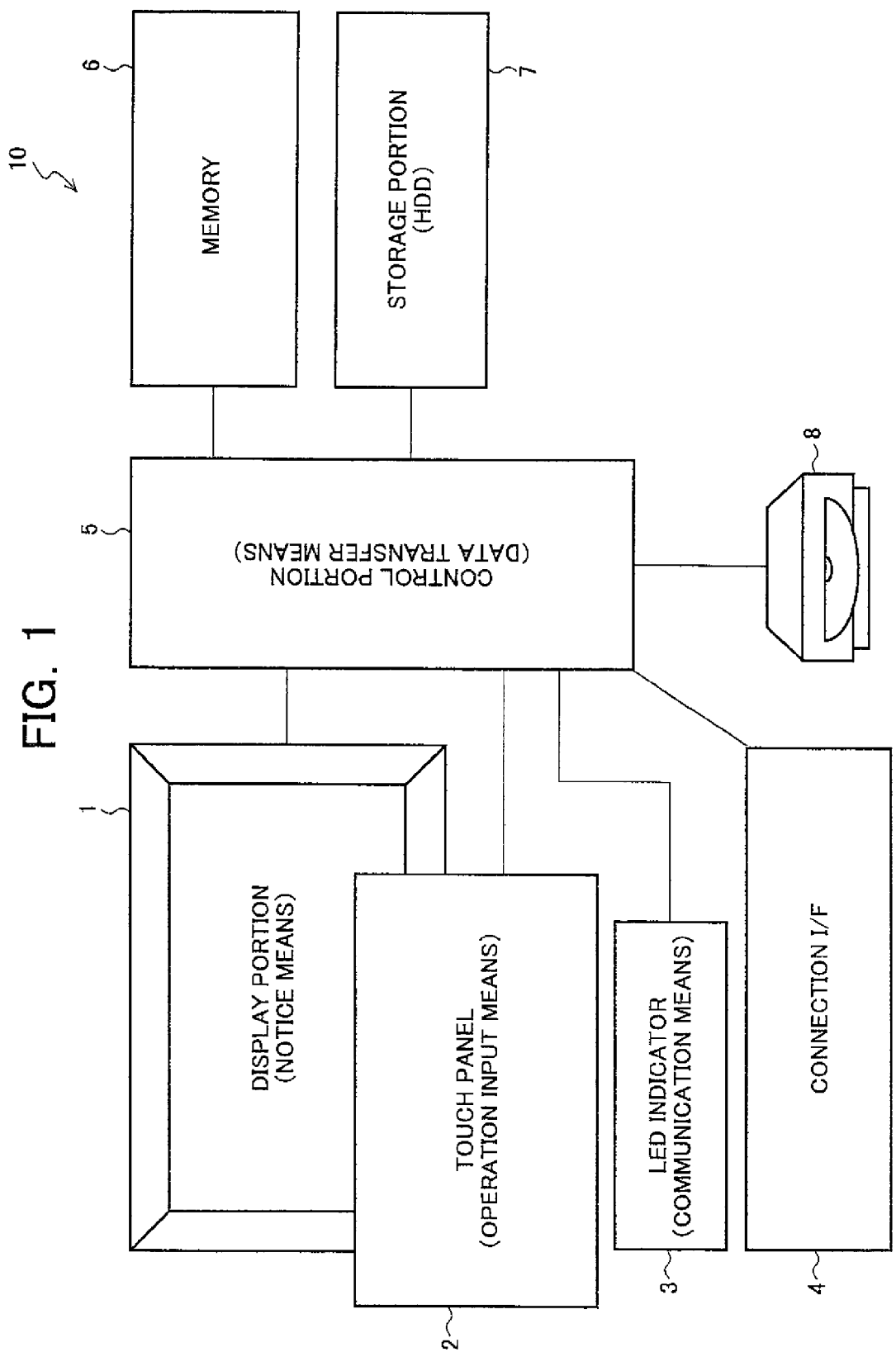
FIG. 1 is a block diagram for showing a structural example of an electronic bulletin apparatus according to an embodiment of the present invention.

Now, referring to the accompanying drawings, preferred embodiments of an electronic bulletin apparatus of the present invention will hereinafter be described. Note that, in the description of each embodiment, if any portion in drawing has same function as that of other portion in other drawing, same reference numeral is given thereto, with repeated description omitted.

In the case of the present invention, most part of an operation of transferring data between an electronic bulletin apparatus and a mobile terminal is performed on the electronic bulletin apparatus side, and an easy-to-understand operation method such as a drag and drop operation is used so that excellent visibility and intuitive operability are realized. The drag and drop operation is a typical operation method as a GUI interface of a PC (personal computer), etc., and this operation is realized by including a touch panel, etc., in the screen side of the electronic bulletin apparatus.

Specifically, by using the finger of a user or a touch pen, etc., data on the screen is subject to a drag operation (operation of moving data with the data held) toward a screen outer edge, and is further subject to a drop operation (operation of releasing the held data) in a vicinity of the screen outer edge, and thereby the data is transferred to the mobile terminal.

FIG. 1 is a block diagram for showing a structural example of an electronic bulletin apparatus according to an embodiment of the present invention, where 10 denotes an electronic bulletin apparatus. The electronic bulletin apparatus 10 includes a display portion 1 corresponding to bulletin means of the present invention for posting data on a screen; a touch panel 2 corresponding to operation input means of the present invention, that is arranged on the screen of the display portion 1; an indicator lamp 3 corresponding to notification means of the present invention for notifying a user of a communication state between the electronic bulletin apparatus 10 and a mobile terminal; a connection interface (connection I/F) 4 corresponding to connection means of the present invention for communicatively connecting to the mobile terminal; a control portion 5 that is composed of a CPU, etc., and controls an operation of the electronic bulletin apparatus 10; a memory 6 that is composed of, for example, a ROM that stores a control program for controlling the operation of the electronic bulletin apparatus 10, and a RAM that serves as a work area when executing the control program; a storage portion 7 such as a hard disc drive (HDD) etc.; and an external drive device 8 for performing a reading/writing from/to an external recording medium such as a CD and a DVD.

The display portion 1 posts data that is stored in the storage portion 7 or in the external recording medium, or data that is stored in an external data server, on the screen. Note that, the data (hereinafter referred to as data object) refers to various kinds of memo files or memo data that are displayed so as to be browsed by a user, and the data is posted on the screen, for example, in a state of an icon, etc. Of course, a plurality of data may be posted simultaneously.

The touch panel 2 recognizes a coordinate position on the screen where an instruction (contact) is made by the input means such as the finger of a user or a touch pen, to realize the drag and drop operation with the data object displayed on the screen.

The control portion 5 corresponds to data transfer means of the present invention, and transfers the data object on the screen to the mobile terminal based on the operation input received by the touch panel 2. For example, when the data object posted on the screen is moved to the vicinity of the screen outer edge by the drag operation by the user to be subject to the drop operation in the vicinity of the screen outer edge, the control portion 5 transfers the data from the electronic bulletin apparatus 10 to the mobile terminal.

The connection I/F 4 connects the mobile terminal wirelessly or via a cable. For example, various kinds of connection modes such as a USB (Universal Serial Bus) connection, a wireless LAN, a proximity type non-contact communication, an infrared communication, and a short distance wireless communication (Blue Tooth), are applicable.

Figure 2:
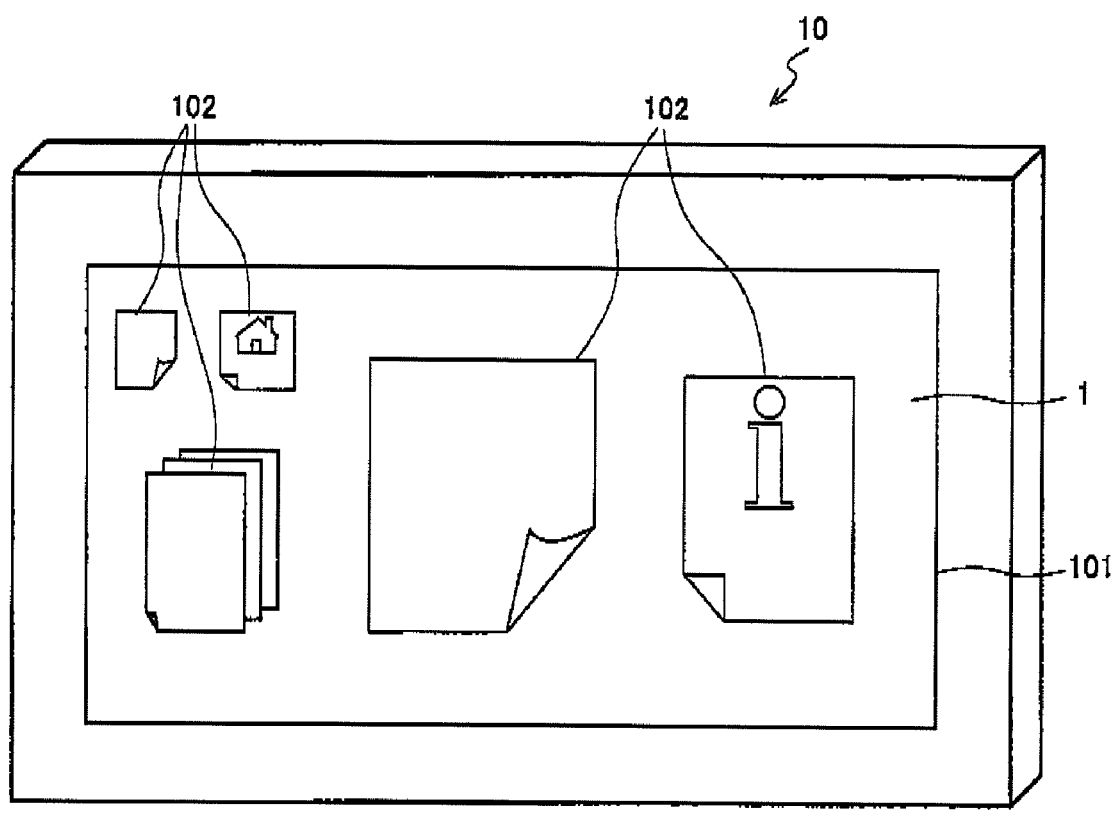
FIG. 2 is a diagram for showing a screen example where data objects are displayed on the electronic bulletin apparatus of the present invention.

FIG. 2 is a diagram for showing a screen example where data objects are displayed on the electronic bulletin apparatus 10 of the present invention. In this figure, 101 denotes a screen outer edge of the display portion 1, and 102 denote various kinds of data objects. The electronic bulletin apparatus 10 posts data objects accumulated in the electronic bulletin apparatus 10, or data objects obtained from a data server that is connected to the electronic bulletin apparatus 10 via a network, on the screen so as to be browsed by a user. Although various kinds of display formats are assumed for the data object 102, any of which may be identified as separate data.

Figure 3:
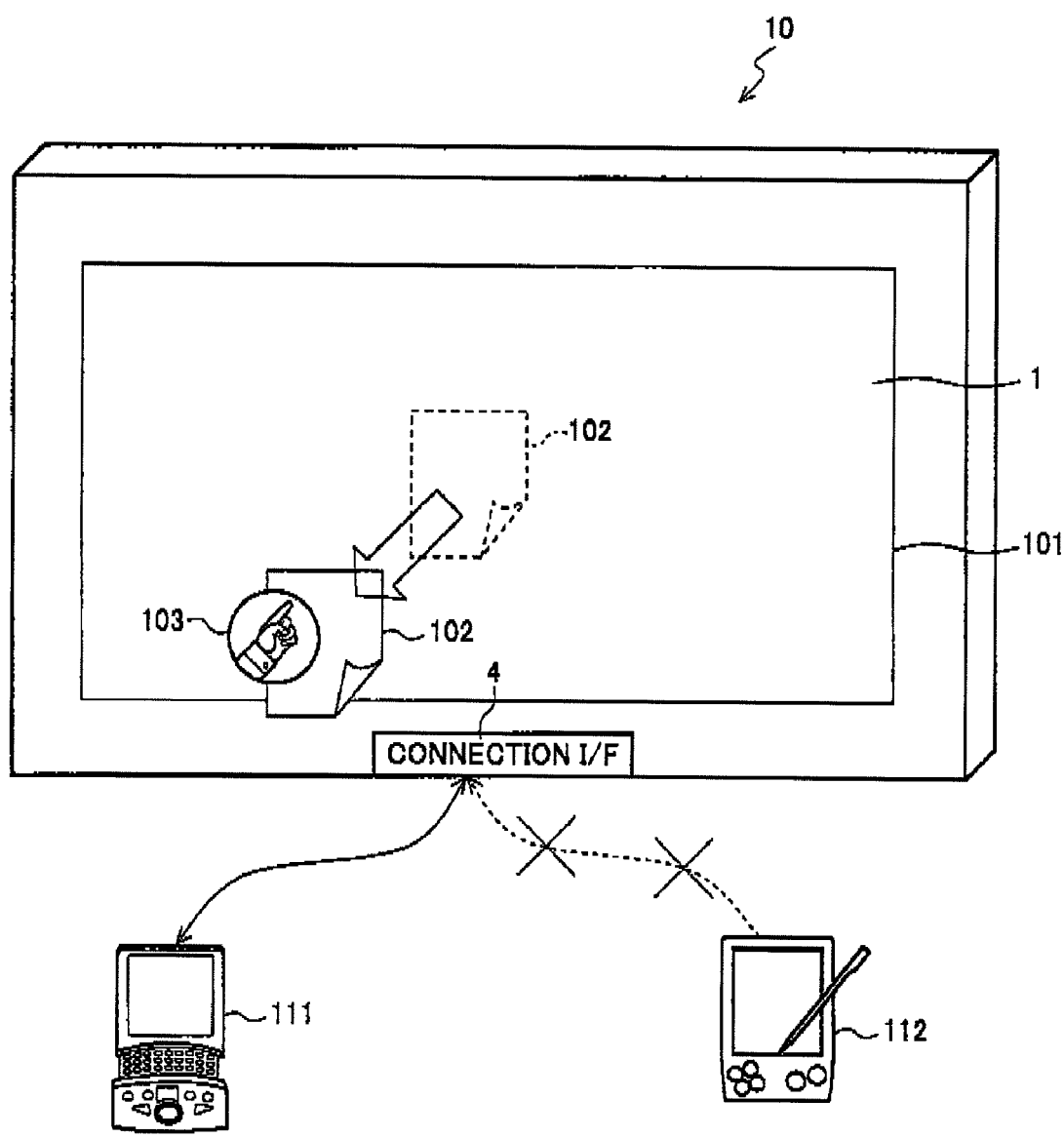
FIG. 3 is a diagram for explaining an example of a data transfer process by the electronic bulletin apparatus of the present invention.

FIG. 3 is a diagram for explaining an example of a data transfer process by the electronic bulletin apparatus 10 of the present invention. In this figure, 111 and 112 denote mobile terminals. An operation when a user 103 points an arbitrary data object 102 is considered to be performed in various kinds of patterns (for example, magnified display and display of a document on next page) depending on characteristics of the electronic bulletin apparatus 10 and the data object 102, however, in the case of the present embodiment, it is assumed that a drag operation can be performed for all of the data objects on the screen of the electronic bulletin apparatus 10.

Further, the electronic bulletin apparatus 10 is communicatively connected to the mobile terminal 111 carried by the user via the connection I/F 4, and is provided with a function of transmitting/receiving the data object 102. Although the connection I/F 4 is applicable regardless of wired or wireless state, the mobile terminal and the electronic bulletin apparatus 10 are basically connected one on one. If another mobile terminal 112 exists, only one of the mobile terminals 111 and 112 is connected to the electronic bulletin apparatus 10, and a connection other than this connection is excluded.

Note that, as the mobile terminals 111 and 112, for example, personal information terminals such as a PIN and a handy terminal; portable terminals such as a mobile phone, a PDA, and a notebook-size PC; and external recording mediums such as an IC tag, an IC card, and a memory card, are assumed.

The First Embodiment

Figure 4:
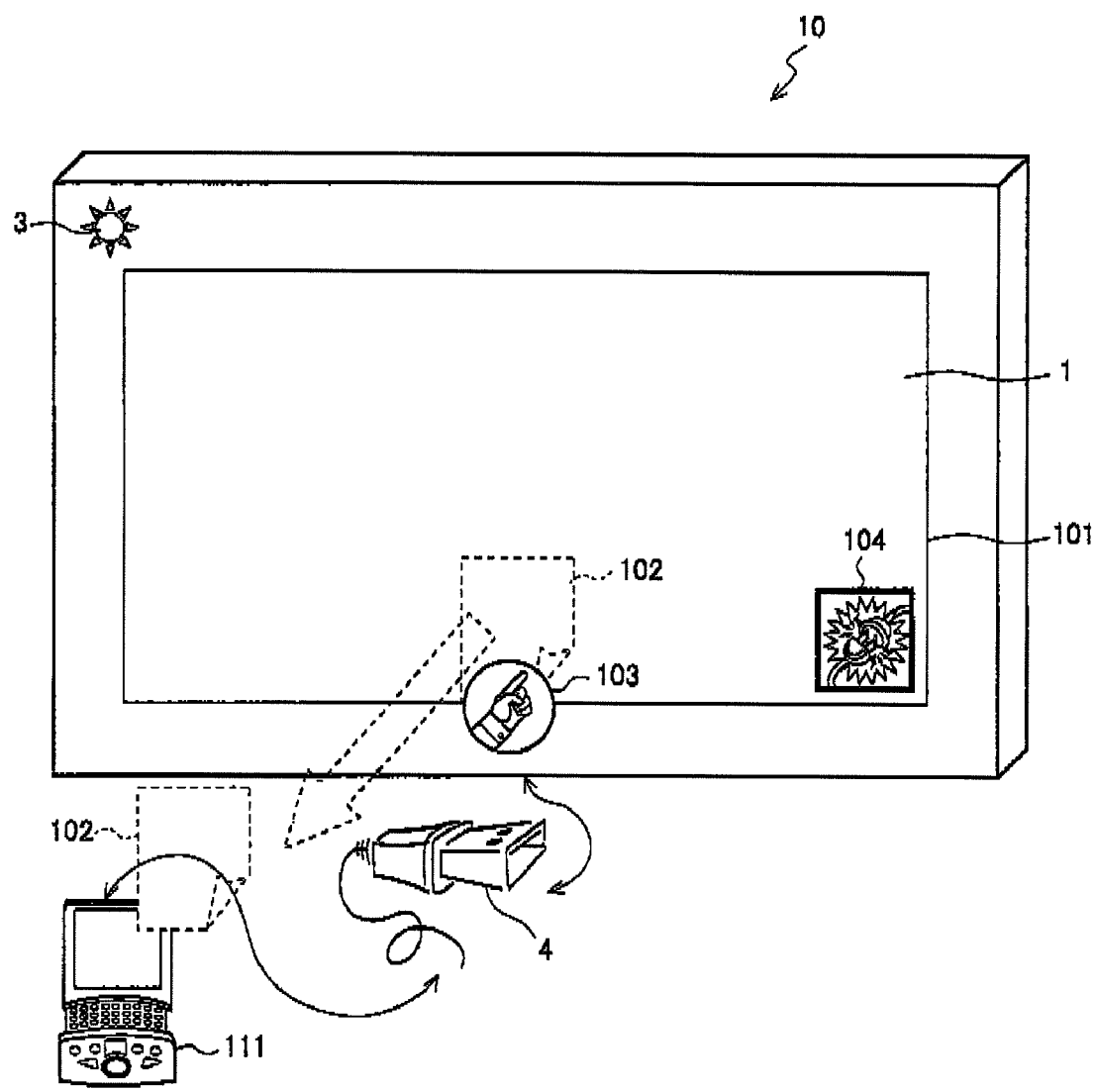
FIG. 4 is a diagram for explaining an example of a data transfer process by an electronic bulletin apparatus according to a first embodiment of the present invention.

FIG. 4 is a diagram for explaining an example of a data transfer process by the electronic bulletin apparatus 10 according to a first embodiment of the present invention. In the case of the present embodiment, it is assumed that the connection I/F 4 for connecting the electronic bulletin apparatus 10 and the mobile terminal 111 performs a connection by a cable such as a USB. In addition, examples of means for connecting the mobile terminal exclusively include a method in which there is provided only one cable connection port, or a method in which a plurality of connection ports are provided and only the connection by the mobile terminal that has established the connection at first is effective. In this example, data is transferred to the mobile terminal 111 using a USB storage class driver.

When the connection of the electronic bulletin apparatus 10 and the mobile terminal 111 is established, then the indicator lamp (hereinafter represented by an LED indicator) 3 for notifying a user of the establishment of the connection is lit or blinked. Alternatively, the notification to the user may be performed by converting a luminescent color of the LED indicator 3, for example, from "red" to "green". As the notification method for notifying the user, without being restricted to the LED indicator 3, a method in which an alarm sound or a voice message is outputted to notify the establishment of the connection, or a method in which a message such as "the connection has been established" is displayed on the screen, is applicable.

When the connection is established as described above, between the electronic bulletin apparatus 10 and the mobile terminal 111, drag operations for all directions (vertical and horizontal, right and left) of each screen outer edge 101 of the electronic bulletin apparatus 10 are recognized as the operations of transferring the data to the mobile terminal 111. At this time, an attribute value of the mobile terminal 111 (such as user information) may be acquired simultaneously.

Further, since the USE storage class is used in the present embodiment, an interface for disconnecting USB connection 104 is also displayed simultaneously. The interface for disconnecting USB connection 104 is always displayed while the mobile terminal 111 is being connected. When a user performs an operation such as a click with respect to the interface for disconnecting USB connection 104 to disconnect the connection of the mobile terminal 111, the LED indicator 3 is turned off. After confirming that the LED indicator 3 is turned off, the user removes the mobile terminal 111 from the USB cable. Thereby, it is possible to remove the mobile terminal 111 safely and prevent the destruction of the file structure in the terminal.

Next, the user 103 drags an arbitrary data object 102 to be transferred to the mobile terminal 111, that is displayed on the electronic bulletin apparatus 10, to the screen outer edge 101 of the electronic bulletin apparatus 10. The drop operation is performed at the time when the data object 102 reaches the screen outer edge 101 (herein lower side of the screen), so as to start the data transfer.

Here, the transfer operation may be changed depending on an attribution of the data. In other words, when the data object 102 is specific personal information, the data object 102 is subject to a move process, where the electronic bulletin apparatus 10 deletes the data object that is a source of the transfer. On the other hand, when the data object 102 is public information, the data object 102 is subject to a copy process, where the data object that is a source of the transfer of the electronic bulletin apparatus 10 is left as it is. In addition, when a group attribution of the data object 102 is different from the user of the mobile terminal 111, the data transfer to the mobile terminal 111 is prohibited.

Next, the electronic bulletin apparatus 10 may notify the user that the data is being transferred to the mobile terminal 111 by turning on the LED indicator 3, for example, in "red". Further, when the data transfer to the mobile terminal 111 is completed, the electronic bulletin apparatus 10 may notify the user by converting the luminescent color of the LED indicator 3 into "green". Furthermore, without being restricted to the LED indicator, the notification may be performed by displaying a message such as "data is being transferred" or "data transfer is completed" on the screen. Note that, the notification same as the notification by the electronic bulletin apparatus 10 may be performed in the mobile terminal 111 side.

While the connection between the electronic bulletin apparatus 10 and the mobile terminal 111 is being established, the user is capable of repeating the above-mentioned operations from the data transfer to the user notification, if necessary.

When all of the data objects 102 are obtained from the electronic bulletin apparatus 10, the connection of the electronic bulletin apparatus 10 and the mobile terminal 111 is disconnected to be completed. In this example, the USB storage class is assumed, and therefore it is necessary to perform an operation of explicitly releasing the connection by operating the interface for disconnecting USB connection 104.

Figure 5:
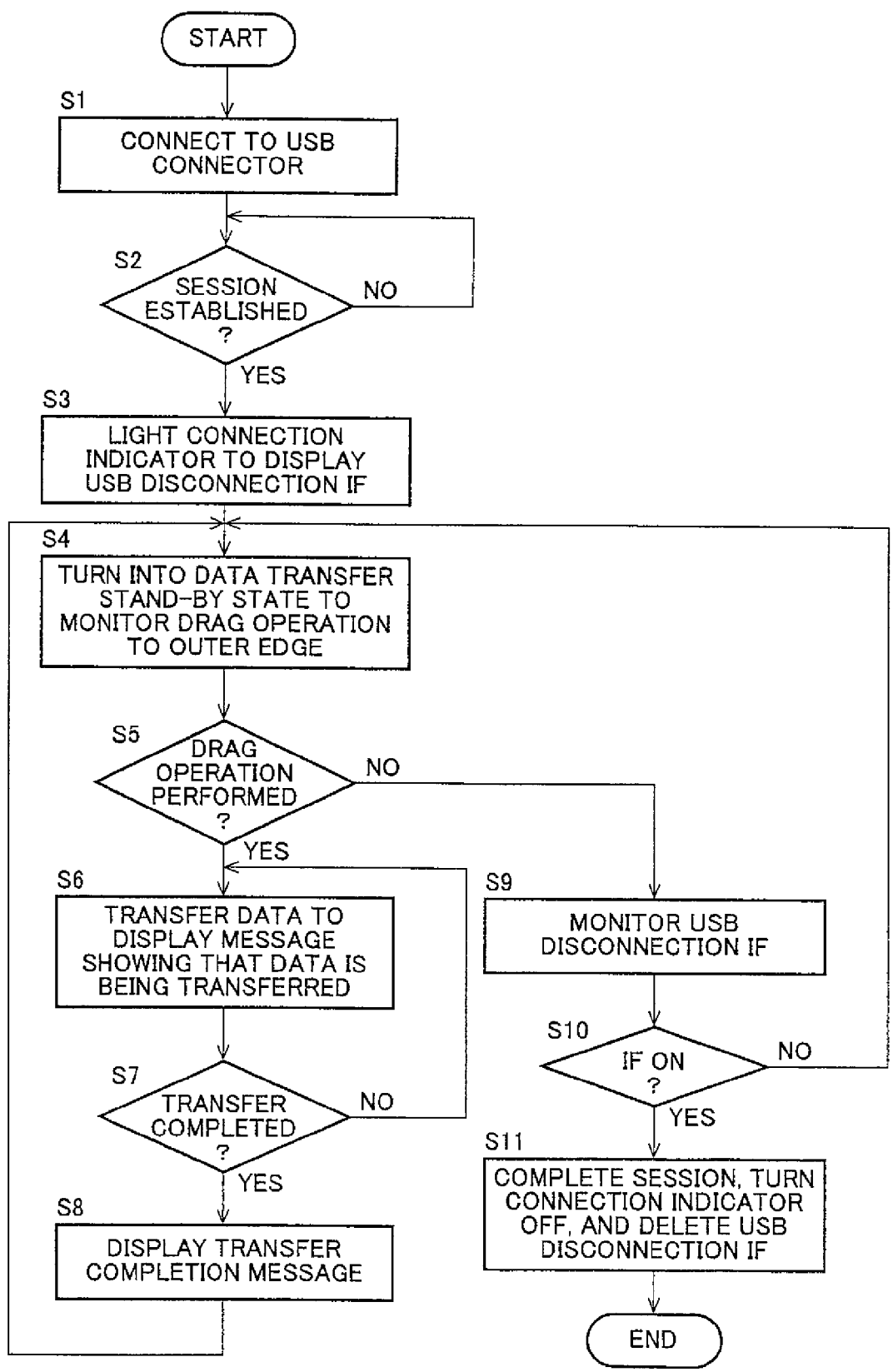
FIG. 5 is a flowchart for explaining the example of the data transfer process by the electronic bulletin apparatus according to the first embodiment of the present invention.

FIG. 5 is a flowchart for explaining the example of the data transfer process by the electronic bulletin apparatus 10 according to the first embodiment of the present invention. First, when the mobile terminal 111 is connected to a USB connector (step S1), the electronic bulletin apparatus 10 determines whether a session is established (step S2), and when the session is determined to be established (in the case of YES), the LED indicator 3 for notifying the establishment of the connection is lit to display the interface for disconnecting USB connection 104 (step S3). Alternatively, at the step S2, when the session is determined to be not established (in the case of NO), going back to the step S2 to repeat the process.

Next, the electronic bulletin apparatus 10 turns the data object 102 into a transfer standby state, and monitors the drag operation of the data object 102 toward the screen outer edge 101 (step S4), followed by determining whether the drag operation toward the screen outer edge 101 is performed (step S5). When the drag operation is performed (in the case of YES), the data object 102 is transferred to the mobile terminal 111 to display a message showing that the data is being transferred on the screen (step S6).

Subsequently, the electronic bulletin apparatus 10 determines whether the data transfer to the mobile terminal 111 is completed (step S7), and when the data transfer is completed (in the case of YES), a message for notifying the transfer completion is displayed on the screen (step S8), followed by going back to the step S4 to repeat the process. Alternatively, at the step S7, when the data transfer is not completed (in the case of NO), going back to the step S6 to repeat the process.

On the other hand, when the drag operation is not performed at the step S5 (in the case of NO), the electronic bulletin apparatus 10 monitors the interface for disconnecting USB connection 104 (step S9) to determine whether the interface 104 is turned on (clicked) (step S10). Then, when the interface 104 is turned on (in the case of YES), the session is completed and the LED indicator 3 is turned off, followed by deleting the interface for disconnecting USB connection 104 (step S11). Alternatively, at the step S10, when the interface for disconnecting USB connection 104 is not turned on (in the case of NO), going back to the step S4 to repeat the process.

In accordance with the present embodiment, in the electronic bulletin apparatus that is communicatively connected to the mobile terminal, a data transfer to the mobile terminal can be performed by an intuitive operation such as a drag and drop operation while posting the data with high visibility.

Further, when performing the communication of the electronic bulletin apparatus and the mobile terminal by a cable, a notification to a user is made with the indicator lamp, etc., at the time of establishing a link between devices or completing the data transfer, and thereby it is possible to prevent an imperfect data transfer that may occur in the communication.

The Second Embodiment

Figure 6:
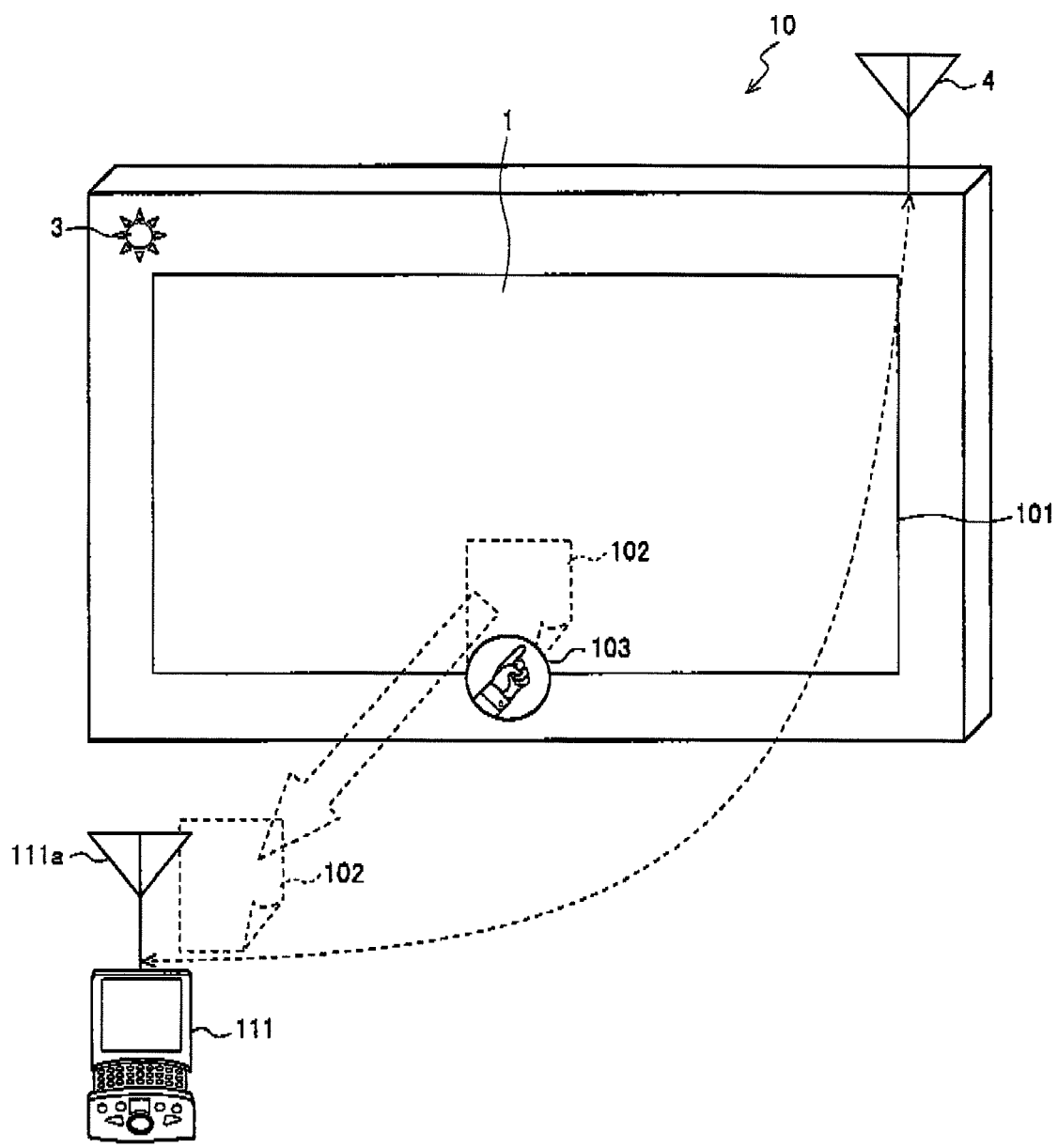
FIG. 6 is a diagram for explaining an example of a data transfer process by an electronic bulletin apparatus according to a second embodiment of the present invention.

FIG. 6 is a diagram for explaining an example of a data transfer process by the electronic bulletin apparatus 10 according to a second embodiment of the present invention. In the case of the present embodiment, although the basic configuration is identical to that of the first embodiment, the mobile terminal 111 includes an antenna 111a for performing a wireless communication, and it is assumed that the connection I/F 4 for connecting the electronic bulletin apparatus 10 and the mobile terminal 111 performs a connection by a wireless LAN. As the wireless LAN, for example, a connection by the IEEE 802.11 standard is performed. Typically, while a simultaneous connection of a plurality of devices is allowed in the IEEE 802.11 standard, only the connection by the mobile terminal that has established the connection at first is effective, herein.

When the mobile terminal 111 obtains all of the data objects 102 from the electronic bulletin apparatus 10, the connection therebetween is disconnected to be completed. A session of the wireless LAN is maintained in the IEEE 802.11 standard, and therefore the operation is completed when the connection of the wireless LAN is completed.

Figure 7:
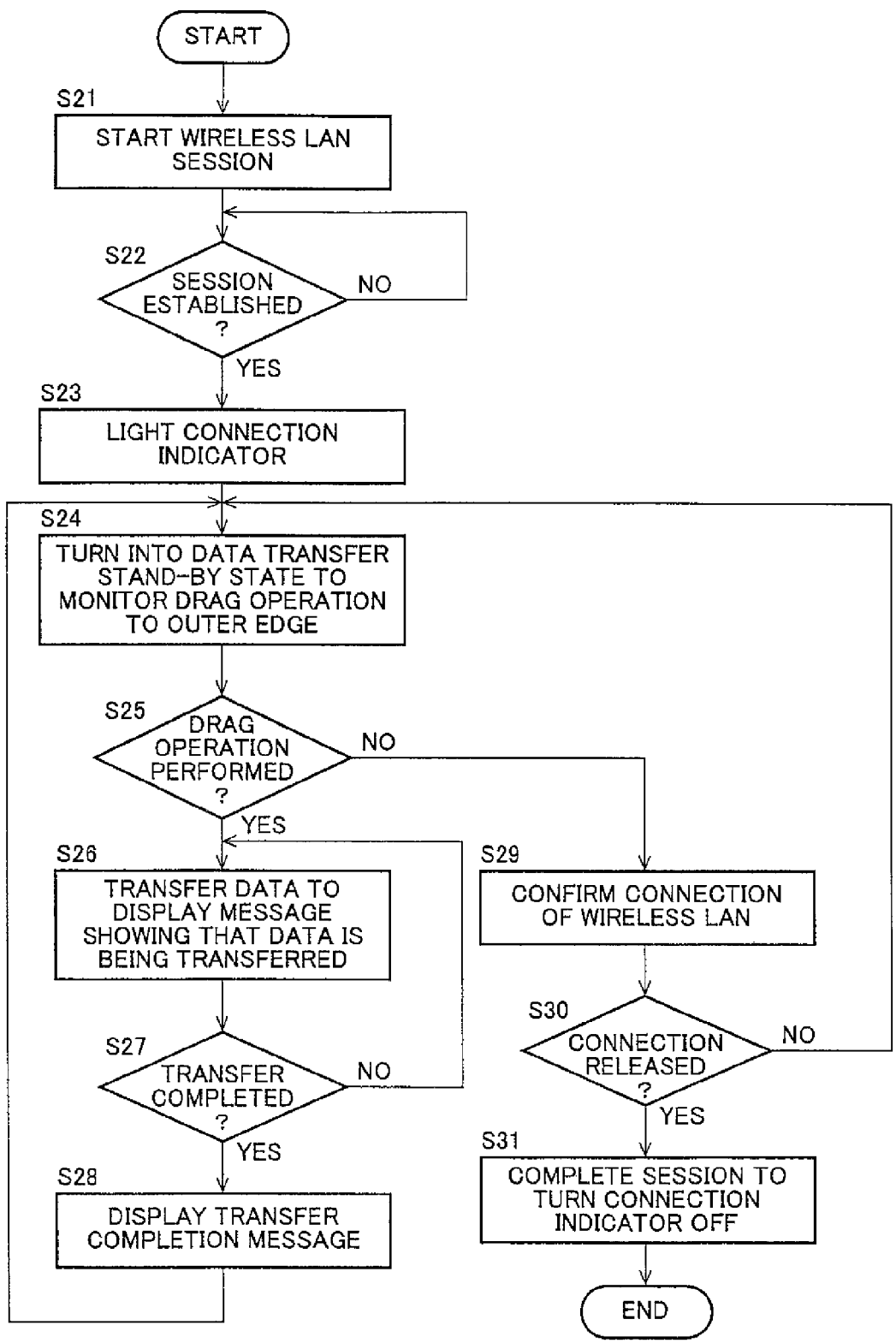
FIG. 7 is a flowchart for explaining the example of the data transfer process by the electronic bulletin apparatus according to the second embodiment of the present invention.

FIG. 7 is a flowchart for explaining the example of the data transfer process by the electronic bulletin apparatus 10 according to the second embodiment of the present invention. First, when a session of the wireless LAN is started between the electronic bulletin apparatus 10 and the mobile terminal 111 (step S21), the electronic bulletin apparatus 10 determines whether the session is established (step S22), and when the session is determined to be established (in the case of YES), the LED indicator 3 for notifying the establishment of the connection is lit (step S23). Alternatively, at the step S22, when the session is determined to be not established (in the case of NO), going back to the step S22 to repeat the process.

Next, the electronic bulletin apparatus 10 turns the data object 102 into a transfer standby state, and monitors a drag operation of the data object 102 toward the screen outer edge 101 (step S24), followed by determining whether the drag operation toward the screen outer edge 101 is performed (step S25). Then, when the drag operation is performed (in the case of YES), the data object 102 is transferred to the mobile terminal 111 to display a message showing that the data is being transferred on the screen (step S26).

Subsequently, the electronic bulletin apparatus 10 determines whether the data transfer to the mobile terminal 111 is completed (step S27), and when the data transfer is completed (in the case of YES), a message for notifying the transfer completion is displayed on the screen (step S28), followed by going back to the step S24 to repeat the process. Alternatively, at the step S27, when the data transfer is not completed (in the case of NO), going back to the step S26 to repeat the process.

On the other hand, when the drag operation is not performed at the step S25 (in the case of NO), the electronic bulletin apparatus 10 confirms the connection of the wireless LAN (step S29) to determine whether the connection is released (step S30). Then, when the connection is released (in the case of YES), the session is completed and the LED indicator 3 is turned off (step S31). Alternatively, at the step S30, when the connection is not released (in the case of NO), going back to the step S24 to repeat the process.

In accordance with the present embodiment, in the electronic bulletin apparatus that is communicatively connected to the mobile terminal, a data transfer to the mobile terminal can be performed by an intuitive operation such as a drag and drop operation, while posting the data with high visibility.

Further, when performing the communication of the electronic bulletin apparatus and the mobile terminal by a wireless LAN, a notification to a user is performed with the indicator lamp, etc., at the time of establishing a link between devices or completing the data transfer, and thereby it is possible to prevent an imperfect data transfer that may occur in the communication.

The Third Embodiment

Figure 8:
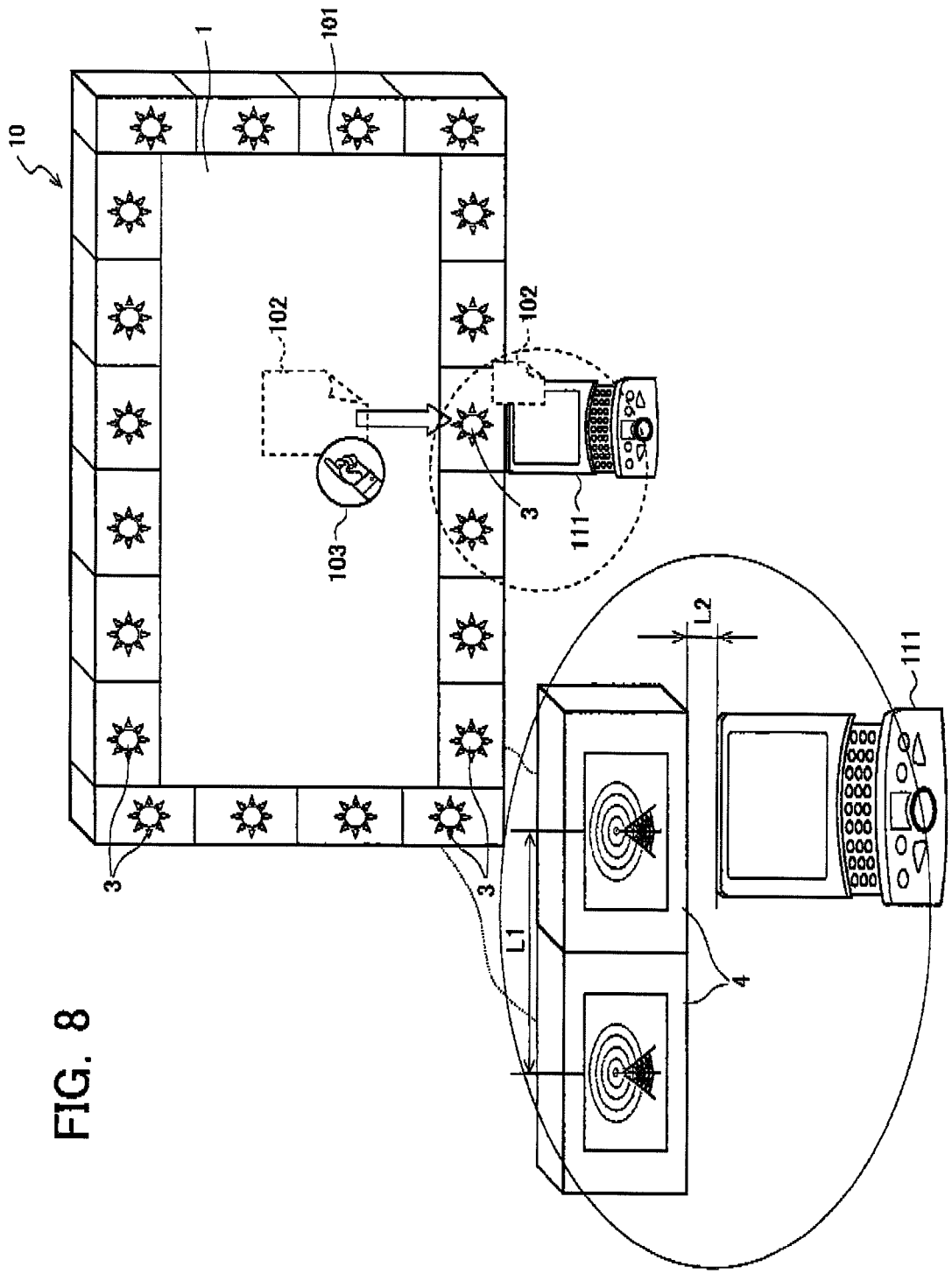
FIG. 8 is a diagram for explaining an example of a data transfer process by an electronic bulletin apparatus according to a third embodiment of the present invention.

FIG. 8 is a diagram for explaining an example of a data transfer process by the electronic bulletin apparatus 10 according to a third embodiment of the present invention. In the case of the present embodiment, although the basic configuration is identical to that of the first embodiment, it is assumed that the connection I/F 4 for connecting the electronic bulletin apparatus 10 and the mobile terminal 111 performs a connection wirelessly. As the wireless connection, for example, a proximity type non-contact communication by the ISO14443 standard that is used in an IC card, etc., is applicable.

Following effects can be obtained with the use of the ISO14443 standard.

(1) As exclusion means for a communication connection, a collision preventive mechanism included in the ISO14443 standard is applicable.

(2) When a plurality of reader/writers are provided as the connection I/F 4, the standard in which a communication interference distance L1 between adjacent reader/writers is the shortest is selected so that the interference between the reader/writers can be minimized.

(3) Because of an effective communication distance L2, the mobile terminal 111 and the electronic bulletin apparatus 10 are configured so as to be arranged adjacently to each other, resulting that a drag and drop operation from the screen outer edge 101 of the electronic bulletin apparatus 10 to the mobile terminal 111 becomes more intuitive when viewed from a user.

In FIG. 8, the screen outer edge 101 of the electronic bulletin apparatus 10 is divided into a plurality of areas, and each of which incorporates the connection I/F (hereinafter referred to as reader/writer 4) for a proximity type non-contact communication. It is assumed that the reader/writers 4 incorporated in the respective areas have a sufficient distance therebetween, respectively, compared with the communication interference distance L1 defined in the ISO14443 standard, which prevents the communication interference between the reader/writers.

The control portion 5 of the electronic bulletin apparatus 10 allows the data object 102 to be transferred to the plurality of mobile terminals 111 via the reader/writers 4 in the respective areas. At this timer the plurality of reader/writers 4 are arranged so as to have a sufficient distance therebetween, respectively, compared with the communication interference distance L1, resulting that it is possible to perform a transfer process of the data object 102 for every area, without interfering mutually in the communication.

The mobile terminal 111 is arranged in the vicinity of the screen outer edge 101 of the electronic bulletin apparatus 10 so as to be brought close to the effective communication distance L2, and thereby the establishment of the connection between the electronic bulletin apparatus 10 and the mobile terminal 111 is automatically started by the reader/writers 4. At this time, the electronic bulletin apparatus 10 or the mobile terminal 111 may notify the user that the distance reaches the effective communication distance L2. As notification means, for example, various kinds of patterns including the lighting of the indicator lamp, the display of a message, and an alarm sound, are assumed.

When the mobile terminal 111 enters in the range of the effective communication distance L2 of the reader/writers 4, a session is established by an initial response operation defined in the ISO14443 standard. When the session is established between the electronic bulletin apparatus 10 and the mobile terminal 111 and the data object 102 is dragged by the user 103 with respect to the area in the screen outer edge 101 of the reader/writer 4 corresponding to the mobile terminal 111, the electronic bulletin apparatus 10 recognizes the drag operation as the operation for transferring the data to the mobile terminal 111 to perform the data transfer.

In the present embodiment, the LED indicator 3 for notifying the user of the communication state between the electronic bulletin apparatus 10 and the mobile terminal 111 may be provided in the respective areas of the screen outer edge 101. Thereby, in the respective areas of the screen outer edge 101, the LED indicator 3 is lit so as to notify to the user, for example, at the time of establishing session between the devices, or completing the data transfer to the mobile terminal 111.

In addition, because one mobile terminal 111 is connectable to one reader/writer in each area, a plurality of mobile terminals 111 are connectable simultaneously, when viewing the electronic bulletin apparatus 10 as a whole. At this time, a non-contact wireless communication may be performed between the plurality of mobile terminals 111 at the same time.

When the mobile terminal 111 obtains all of the data objects 102 from the electronic bulletin apparatus 10, then the connection therebetween is disconnected to complete the session. In the present embodiment, when the mobile terminal 111 is spaced from the electronic bulletin apparatus 10 by the effective communication distance L2 or more, the session is automatically completed.

Figure 9:
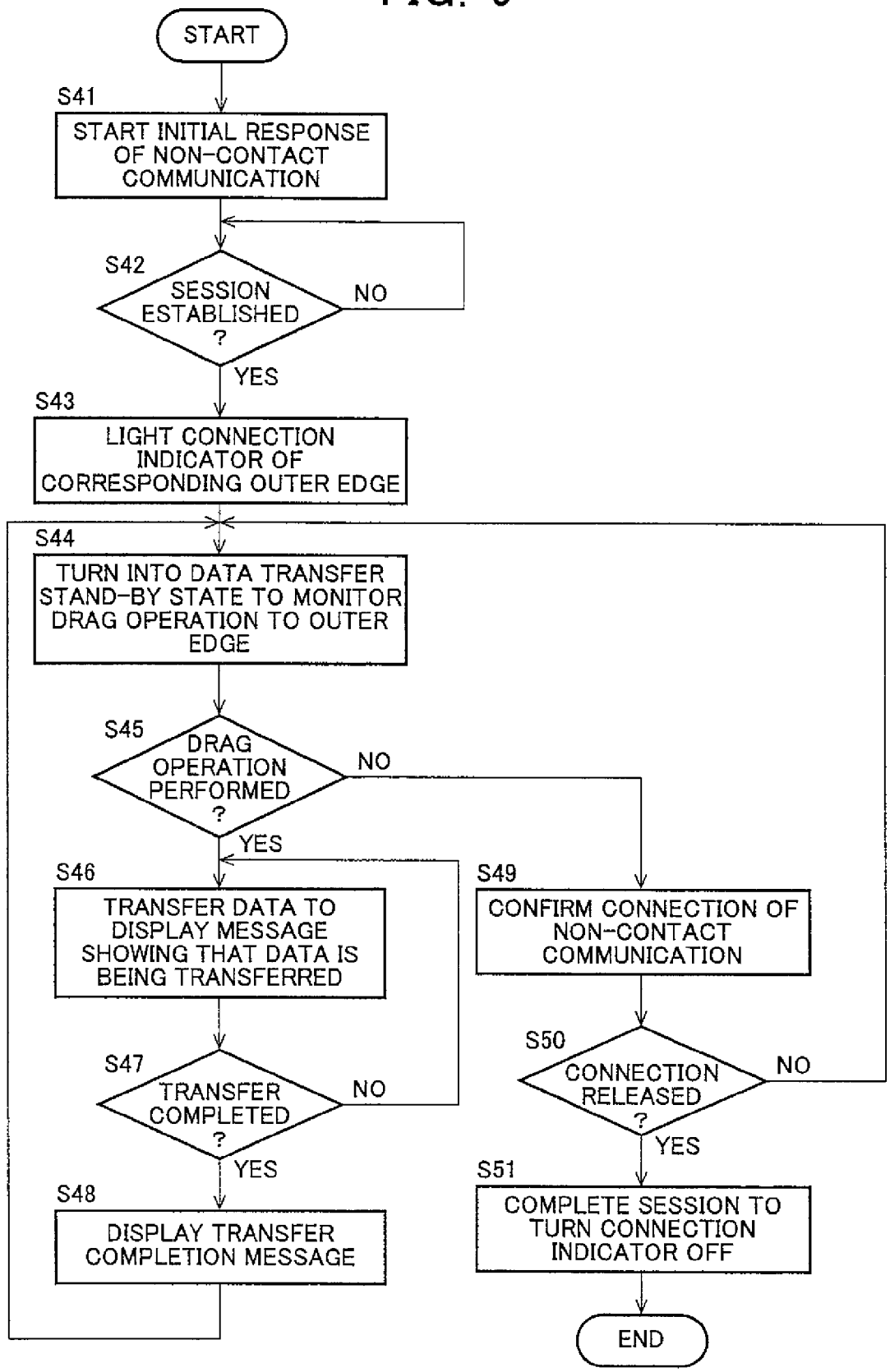
FIG. 9 is a flowchart for explaining the example of the data transfer process by the electronic bulletin apparatus according to the third embodiment of the present invention.

FIG. 9 is a flowchart for explaining the example of the data transfer process by the electronic bulletin apparatus 10 according to the third embodiment of the present invention. First, when an initial response of a non-contact communication is started between the electronic bulletin apparatus 10 and the mobile terminal 111 (step S41), the electronic bulletin apparatus 10 determines whether a session is established (step S42), and when the session is determined to be established (in the case of YES), the LED indicator 3 for notifying the establishment of the connection is lit in the corresponding area of the screen outer edge 101 (step S43). Alternatively, at the step S42, the session is determined to be not established (in the case of NO), going back to the step S42 to repeat the process.

Next, the electronic bulletin apparatus 10 turns the data object 102 into a transfer standby state, and monitors a drag operation of the data object 102 toward the screen outer edge 101 (step S44), followed by determining whether the drag operation toward the screen outer edge 101 is performed (step S45). Then, when the drag operation is performed (in the case of YES), the data object 102 is transferred to the mobile terminal 111 to display a message showing that the data is being transferred on the screen (step S46).

Subsequently, the electronic bulletin apparatus 10 determines whether the data transfer to the mobile terminal 111 is completed (step S47), and when the data transfer is completed (in the case of YES), a message for notifying the transfer completion is displayed on the screen (step S48), followed by going back to the step S44 to repeat the process. Alternatively, at the step S47, when the data transfer is not completed (in the case of NO), going back to the step S46 to repeat the process.

On the other hand, when the drag operation is not performed at the step S45 (in the case of NO), the electronic bulletin apparatus 10 confirms the connection of the non-contact communication (step S49) to determine whether the connection is released (step S50). Then, when the connection is released (in the case of YES), the session is completed and the LED indicator 3 is turned off (step S51). Alternatively, at the step S50, when the connection is not released (in the case of NO), going back to the step S44 to repeat the process.

In accordance with the present embodiment, in the electronic bulletin apparatus that is communicatively connected to the mobile terminal, a data transfer to the mobile terminal can be performed by an intuitive operation such as a drag and drop operation while posting the data with high visibility.

Further, when performing the non-contact wireless communication of the electronic bulletin apparatus and the mobile terminal, a notification to a user is made with the indicator lamp, etc., at the time of establishing a link between devices or completing the data transfer, and thereby it is possible to prevent an imperfect data transfer that may occur in the non-contact communication.

Furthermore, the reader/writers for communication are incorporated for every area in the screen outer edge to control the data transfer operation for every area, resulting that it is possible to prevent the mutual interference between the plurality of mobile terminals.

In each of the embodiments described above, the control portion 5 of the electronic bulletin apparatus 10 may delete the data object 102 posted on the display portion 1 at the time when the data transfer to the mobile terminal 111 is completed. Note that, the time when the data transfer is completed refers to the time when the completion notification of the data transfer is sent from the mobile terminal 111, and received by the electronic bulletin apparatus 10. The deletion of the data object 102 refers to that the data object 102 posted on the display portion 1 is deleted from the screen and the data itself of the data object 102 stored in the storage portion 7 is deleted.

Further, while the description has been made by exemplifying the mobile terminal 111 as the device for communicating with the electronic bulletin apparatus 10, this is not a limitation and, for example, external recording mediums such as an IC tag, an IC card, and a memory card is also applicable. In the case of the IC tag or the IC card, the data object 102 is transferred from the electronic bulletin apparatus 10 by a wireless communication, so that the data object 102 can be transferred to the mobile terminal 111 with a method of reading the IC tag or the IC card by an exclusive reading apparatus. Alternatively, in the case of the memory card, the data object 102 is transferred from the electronic bulletin apparatus 10 by a wired communication such as a USB, so that the data object 102 can be transferred from the memory card to the mobile terminal 111.

In accordance with the present invention, in the electronic bulletin apparatus that is communicatively connected to the mobile terminal, a data transfer to the mobile terminal can be performed by an intuitive operation such as a drag and drop operation while posting the data with high visibility.

The invention claimed is:

1. A stationary electronic bulletin apparatus, comprising:
   a stationary bulletin portion configured to post data on a screen;
   an operation input interface receiving from the screen an operation input for the data posted on the screen;
   the screen having an outer edge divided into a plurality of areas, each area of the plurality of areas having a size corresponding to a size of a mobile terminal and enabling a plurality of mobile terminals to be placed adjacent to the outer edge with each mobile terminal corresponding to a different area of the plurality of areas, each area of the plurality of areas including a separate reader/writer configured to perform non-contact wireless communication with a corresponding mobile terminal; and
   a data transfer unit configured to
      transfer the data on the screen to the mobile terminal based on the operation input received by the operation input interface,
      control the transfer of data for every area so that the plurality of mobile terminals are not interfered mutually via the reader/writer in each area, and
      control the transfer of data such that a particular mobile terminal communicates through the reader/writer in the area that is in closest proximity to said particular mobile terminal.

2. The electronic bulletin apparatus as defined in claim 1, wherein
   the operation input interface is a touch panel that is arranged on the screen of the bulletin portion, and when the data posted on the screen is moved to a vicinity of a screen outer edge by a drag operation to be subject to a drop operation in the vicinity of the screen outer edge, the data transfer unit transfers the data to the mobile terminal.

3. The electronic bulletin apparatus as defined in claim 2, wherein
   the data transfer unit is configured to transfer data to a plurality of mobile terminals via the separate connection interface in each of the divided areas.

4. The electronic bulletin apparatus as defined in claim 3, wherein
   the non-contact wireless communication is performed with the mobile terminal via the reader/writer, and when a distance between the reader/writer and the mobile terminal reaches an effective communication distance, the electronic bulletin apparatus or the mobile terminal notifies a user that the distance has reached the effective communication distance.

5. The electronic bulletin apparatus as defined in claim 3, wherein
   the plurality of mobile terminals are connected via the reader/writers in each of the areas, and the non-contact wireless communication is performed with the plurality of mobile terminals simultaneously.

6. The electronic bulletin apparatus as defined in claim 1, wherein
   the electronic bulletin apparatus includes a notification unit configured to notify a user of a communication state between the electronic bulletin apparatus and the mobile terminal.

7. The electronic bulletin apparatus as defined in claim 3, wherein
   a notification unit is provided in each of the divided areas of the outer edge.

8. The electronic bulletin apparatus as defined in claim 6, wherein
   the notification unit is an indicator lamp, the indicator lamp performs the notification operation to the user at the time when the communication with the mobile terminal is established or when data transfer to the mobile terminal is completed.

9. The electronic bulletin apparatus as defined in claim 1, wherein
   the data transfer unit deletes the data posted by the bulletin portion at the time when the data transfer to the mobile terminal is completed.

10. The electronic bulletin apparatus as defined in claim 7, wherein
    the notification unit is an indicator lamp, the indicator lamp performs the notification operation to the user at the time when the communication with the mobile terminal is established or when data transfer to the mobile terminal is completed.

11. An electronic bulletin apparatus, comprising:
    a stationary bulletin portion configured to post data on a screen;
    a touch panel arranged on the screen of the stationary bulletin portion receiving from the screen an operation input for the data posted on the screen;
    the screen having an outer edge divided into a plurality of areas, each area of the divided plurality of areas having a size corresponding to a size of a mobile terminal, each of the divided areas including a separate reader/writer configured to perform non-contact wireless communication; and
    a data transfer unit configured to transfer the data on the screen to a plurality of mobile terminals via the separate reader/writer in each of the divided areas based on the operation input received by the touch panel, and to control the data transfer for every area of the plurality of areas so that the plurality of mobile terminals are not interfered mutually via the reader/writer in each of the divided areas, wherein the data transfer unit is configured to control the transfer of data such that a particular mobile terminal communicates through the reader/writer in the divided area that is in closest proximity to said particular mobile terminal.

12. An electronic bulletin apparatus, comprising:

a stationary bulletin portion configured to post data on a screen;

a touch panel arranged on the screen of the bulletin portion receiving from the screen an operation input for the data posted on the screen;

the screen having an outer edge divided into a plurality of areas, each area of the plurality of areas having a size corresponding to a size of a mobile terminal, and including a separate reader/writer configured to perform non-contact wireless communication with a mobile terminal, and a separate notification unit provided in each area of the plurality of areas; and a data transfer unit configured to transfer the data on the screen to a plurality of mobile terminals via the separate reader/writer in each of the divided areas based on the operation input received by the touch panel, and to control the data transfer for every area of the plurality of areas so that the plurality of mobile terminals are not interfered mutually via the reader/writer in each of the divided areas, wherein the data transfer unit is configured to control the transfer of data such that a particular mobile terminal communicates through the reader/writer in a particular area of the plurality of areas that is in closest proximity to said particular mobile terminal, and the notification unit in the particular area performs a notification operation to a user at a time when communication is established between the particular mobile terminal and the particular area or when data transfer to the particular mobile terminal through the reader/writer in the particular area is completed.

* * * * *